United States Patent
Kabe

(10) Patent No.: US 6,397,089 B1
(45) Date of Patent: May 28, 2002

(54) PORTABLE TERMINAL DEVICE

(75) Inventor: Masayuki Kabe, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/377,016

(22) Filed: Aug. 18, 1999

(30) Foreign Application Priority Data

Aug. 20, 1998 (JP) .......................................... 10-234579

(51) Int. Cl.$^7$ ................................................ H04Q 7/20
(52) U.S. Cl. ..................................... 455/572; 455/420
(58) Field of Search ................................ 455/420, 419, 455/423, 13.4, 522, 550, 556, 557, 571, 572, 573, 574, 127, 169.1, 195.1, 198.1, 69, 575; 709/217, 219

(56) References Cited

U.S. PATENT DOCUMENTS

| | | | |
|---|---|---|---|
| 4,647,721 A | * 3/1987 | Busam et al. | 379/102.04 |
| 5,367,563 A | * 11/1994 | Sainton | 379/93.29 |
| 5,374,923 A | * 12/1994 | Sakamoto | 340/654 |
| 5,479,479 A | * 12/1995 | Braitberg et al. | 455/404 |
| 5,797,089 A | * 8/1998 | Nguyen | 455/403 |
| 6,052,565 A | * 4/2000 | Ishikura et al. | 455/67.1 |
| 6,088,600 A | * 7/2000 | Rasmussen | 455/574 |
| RE37,141 E | * 4/2001 | OaSullivan | 455/557 |

FOREIGN PATENT DOCUMENTS

JP          5-95463          4/1993

* cited by examiner

*Primary Examiner*—Dwayne Bost
*Assistant Examiner*—Jean A Gelin
(74) *Attorney, Agent, or Firm*—Dike, Bronstein, Roberts & Cushman IP Group Edwards & Angell, LLP; David G. Conlin; David A. Tucker

(57) ABSTRACT

A portable terminal device includes a connector connected to a mobile telephone terminal device providing a signal that changes its output depending upon whether power is turned on or not, a power-on detection device connected to the connector, a power supply circuit under control of the power-on detection device, and a data communication device receiving power supply from the power supply circuit, and under control of the output of the power-on detection device. The data communication device includes a processor that activates system software when power supply is initiated. The system software activates communication software in response to an output of the power-on detection device. The portable terminal device can include a data adapter unit coupled between the data communication device and the connector. The data adapter unit may have power controlled by the output of the power-on detection device.

21 Claims, 4 Drawing Sheets

PORTABLE TERMINAL DEVICE

BACKGROUND OF THE INVENTION

1. Field of the Invention

The present invention relates to a portable terminal device that carries out data communication via a mobile telephone terminal device. More particularly, the present invention relates to a portable terminal device that will be automatically turned on even if the power is turned off in the event of power being supplied to a mobile telephone terminal device.

2. Description of the Background Art

A portable terminal device that carries out data communication via a mobile telephone terminal device such as the PHS (Personal Handy Phone System) or PDC (Personal Digital Cellular) is becoming more popular than ever. By virtue of such portable terminal devices, the user can carry out data communication no matter where he/she is without any particular communication facility as long as communication via a mobile telephone terminal is possible.

Communication using such a portable terminal device is commenced generally by the procedure set forth in the following. First, the mobile telephone terminal device is connected with the portable terminal device. The power of the mobile telephone terminal device and the power of the portable terminal device are turned on. Communication software is activated on the portable terminal device by operating a mechanical key or by operating an icon displayed electronically. Upon completion of the series of operation, the portable terminal device can initiate data communication. This portable terminal device is referred to as the first conventional art hereinafter.

The technique of automatically turning on the power of a facsimile apparatus when commencing facsimile reception is disclosed in Japanese Patent Laying-Open No. 5-95463 as one type of data communication. According to this publication, the facsimile apparatus includes a circuit that detects the status of the telephone line. Upon detection of a call by the circuit that detects the status of the telephone line, the power of the facsimile device is turned on to initiate facsimile reception. This art is referred to as the second conventional art hereinafter.

According to the portable terminal device of the first conventional art, an operation of turning on the power is required to initiate the operation for data communication. In order to activate the communication software, the mechanical or electronical key provided at the portable terminal device must be manipulated or the process of manipulating the icon displayed on a display device by means of software must be carried out.

In general, a portable terminal device is mainly used other than at home. Now that electronic mail is so common, more and more users will receive electronic mail even when he/she is out if there is some time to spare. This often occurs when the portable terminal device is used in an area of limited space such as in an automobile or on a train. Then, even a desk cannot be used. Connecting a mobile telephone terminal device with a portable terminal device is not so easy under such an environment. Furthermore, the operation of turning on the power of each device and the operation to activate the communication software is even more difficult. The user may abandon the task of communication or be prevented from carrying out the operation properly. These problems should be solved.

The second conventional art is directed to save the power consumed by the facsimile device fixedly connected to the telephone line and is oriented to only the case of reception. The portable terminal device is not always connected to the telephone terminal in general. Furthermore, the portable terminal device will often carry out transmission in the data communication process. Therefore, the second conventional art cannot be applied to data communication based on a portable terminal device.

SUMMARY OF THE INVENTION

In view of the foregoing, an object of the present invention is to provide a portable terminal device that can help users carry out data communication without difficulty even in an environment where the operation of the portable terminal device is not easy.

Another object of the present invention is to provide a portable terminal device that requires less task in initiating data communication.

A further object of the present invention is to provide a portable terminal device that, when used connected to a mobile telephone terminal device, has its power turned on upon power-on of the mobile telephone terminal device.

Still another object of the present invention is to provide a portable terminal device that, when used connected to a mobile telephone terminal device, has preparation of data communication automatically effected upon power-on of the mobile telephone terminal device.

A still further object of the present invention is to provide a portable terminal device that requires less task in ending data communication.

Yet a further object of the present invention is to provide a portable terminal device that can specify the power-on status of the portable terminal device after data communication ends.

According to an aspect of the present invention, a portable terminal device includes a connector to be connected to a mobile telephone terminal device that provides a first signal that changes its status of output depending upon whether power is turned on or not, a power-on detection device connected to the connector, a power supply circuit under control of the power-on detection device, and a data communication device receiving power supply from the power supply circuit, and under control of the output of the power-on detection device.

Preferably, the data communication device includes a processor that activates system software when power supply is initiated from the power supply circuit. The system software responds to an output of the power-on detection device to activate communication software for data communication. The system software can activate an application program that uses the communication software in response to the output of the power-on detection device.

Further preferably, the portable terminal device includes a data adapter unit coupled between the data communication device and the connector. The data adapter unit has the power controlled by the output of the power-on detection device.

According to another aspect of the present invention, a portable terminal device includes a connector to be connected to a mobile telephone terminal device that provides a first signal changing the status of its output depending upon whether power is turned on or not, a power-on detection device connected to the connector, a mode switch circuit receiving the output of the power-on detection device and a predetermined mode specify signal at the inputs to output a mode signal, a power supply circuit under control of the mode signal, and a data communication device receiving power supply from the power supply circuit, and under control of the output of the power-on detection device.

Preferably, the data communication device includes a processor that activates system software when power supply from the power supply circuit is initiated. The system software activates communication software for data communication in response to the mode signal. The system software can also activate an application program that uses the communication software in response to the output of the power-on detection device.

Further preferably, the system software can execute an operation mode set application that specifies an operational mode. The operational mode set application provides a mode specify signal to the mode switch circuit.

The portable terminal device further includes a data adapter unit coupled between the data communication device and the connector. The data adapter unit has the power supply controlled by the output of the power-on detection device.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
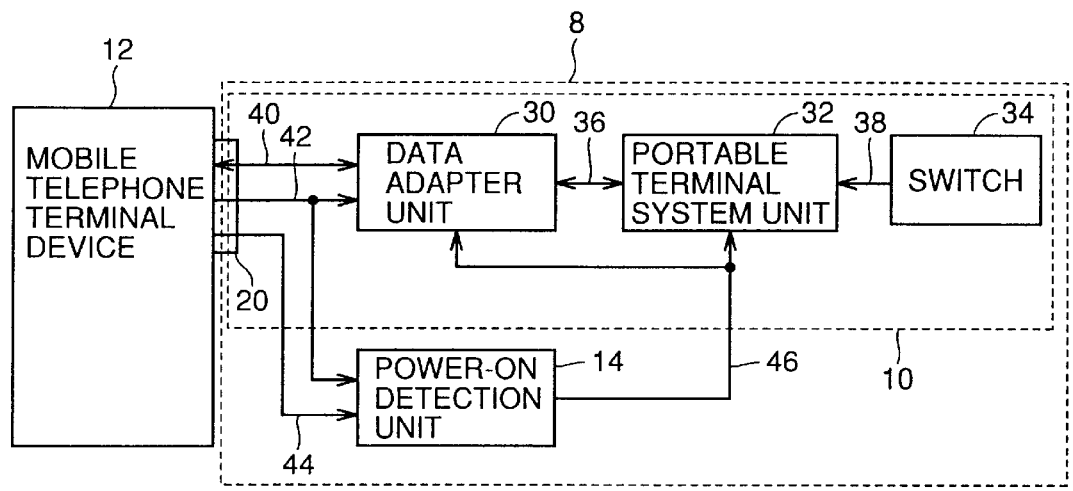
FIG. 1 is a block diagram of a portable terminal device according to a first embodiment of the present invention.

Referring to FIG. 1, a portable terminal device 8 of the first embodiment of the present invention is used being connected to a mobile telephone terminal device 12 via a connector 20. Portable terminal device 8 includes a portable terminal unit 10 having the general function as a portable terminal device to carry out data communication with another terminal device not shown via a data line 40 and mobile telephone terminal device 12 in response to a data adapter activate signal 42, and a power-on detection unit 14 detecting power-on of mobile telephone terminal device 12 in response to data adapter activate signal 42 applied from mobile telephone terminal device 12 and a signal on a signal line 44 to apply a power-on signal 46 to portable terminal unit 10. As will be described afterwards, portable terminal unit 10 has the function of being powered on in response to power-on signal 46 even when in a power-off status. In the present embodiment, it is assumed that mobile telephone terminal device 12 has the function to output data adapter activate signal 42 attaining a different status according to the power-on of mobile telephone terminal device 12, as defined by the PHS. In the following description, it is assumed that data adapter activate signal 42 is at an L level (logical low) and at an H level (logical high) when the power of mobile telephone terminal device 12 is on and off, respectively.

Portable terminal unit 10 includes a switch 34 operated when the power of portable terminal unit 10 is manually turned on as in the conventional case, a portable terminal system unit 32 powered on in response to a switch signal 38 from switch 34 or power-on signal 46, a data adapter unit 30 connected to portable terminal system unit 32 via a bi-directional data line 36 and to mobile telephone terminal device 12 via a bi-directional data line 40 to provide interface therebetween, and connector 20 described above. Data adapter unit 30 operates in response to data adapter activate signal 42 from mobile telephone terminal device 12. Signal line 44 is connected to the ground level in mobile telephone terminal device 12. Data adapter unit 30 further establishes connection with a data adapter unit of another communication station not shown. Data adapter unit 30 has the function to convert the format of data output from portable terminal system unit 32 into a data format for transmission through a mobile telephone line.

Portable terminal system unit 32 provides commands such as line connection, data communication, line release and the like towards data adapter unit 30.

Figure 2:
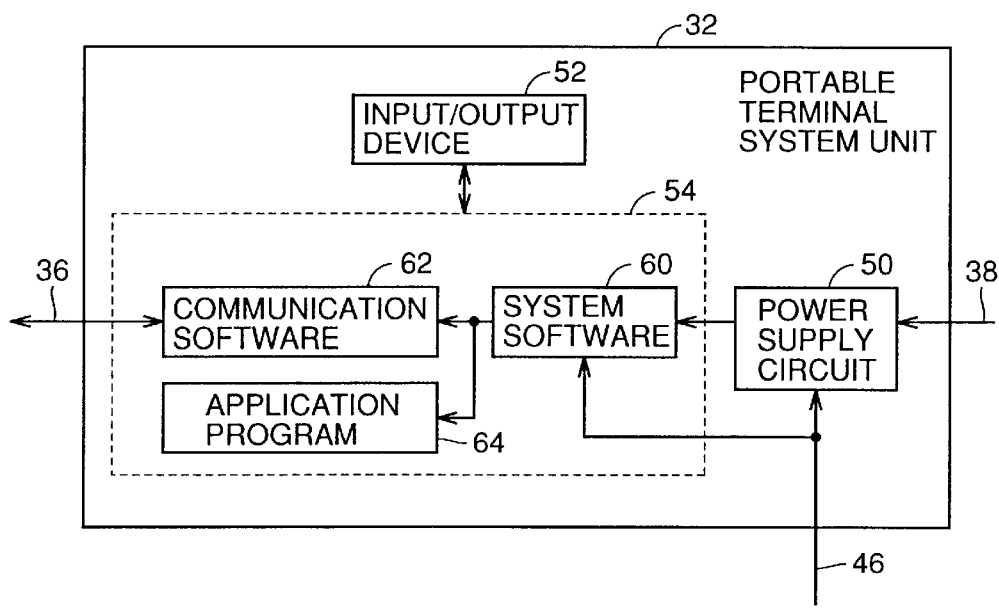
FIG. 2 is a block diagram of a portable terminal system unit 32 of the portable terminal device of the first embodiment.

Referring to FIG. 2, portable terminal system unit 32 includes a power supply circuit 50 initiating supply of power to each component in portable terminal unit 10 in response to switch signal 38 or power-on signal 46, a processor 54 functioning as a data communication device, initiating a process in response to the start of power supply from power supply circuit 50, and an input/output device 52 through which the user interacts with processor 54. As shown in FIG. 2, processor 54 can execute system software 60 controlling the entire operation of portable terminal system unit 32, communication software 62 executing the procedure required for data communication with the destination party of communication, and an application program 64 carrying out an interactive process with the user through input/output device 52 and also carrying out data communication with another terminal device not shown utilizing communication software 62.

System software 60 automatically activates communication software 62 when power-on signal 46 is received from power-on detection unit 14 at the time of activation. A predetermined application program 64 can be activated at the same time, if necessary.

Figure 3:
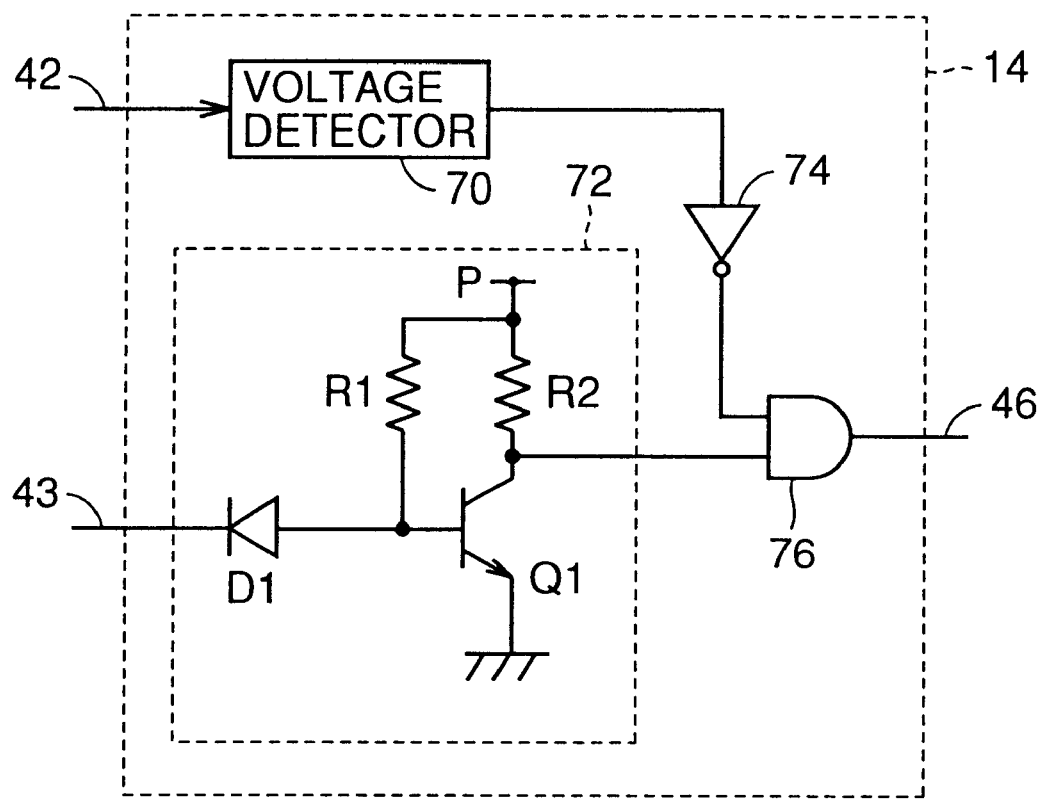
FIG. 3 is a circuit block di gram of a power-on detection unit 14 of the portable terminal device of the first embodiment.

Referring to FIG. 3, power-on detection unit 14 is a logic circuit including a voltage detection unit 70 monitoring data adapter activate signal 42 to output a signal indicating whether power of portable telephone terminal device 12 is on or not, a connection status detection unit 72 connected to a signal line 44 to detect whether connector 20 is connected to mobile telephone terminal device 12 and output a detection signal thereof, an inverter 74 receiving the output of voltage detection unit 70, and an AND gate 76 receiving the output of inverter 74 and the output of connection status detection unit 72 at its two inputs. In the first embodiment, it is assumed that the output of voltage detection unit 70 normally at a high-impedance state is driven to an L level and an H level, respectively, when data adapter activate signal 42 attains an L level and an H level, respectively. The structure of voltage detection unit 70 functioning as above is obvious to one skilled in the art.

The output of voltage detection unit 70 is inverted by inverter 74 and applied to one input of AND gate 76.

Connection status detection unit 72 includes a diode D1 having an anode connected to signal line 44, a resistor R1 connected between a plus power P supplied from a backup secondary battery and the cathode of diode D1, a transistor Q1 having a base connected to the cathode of diode D1 and an emitter connected to ground, and a resistor R2 connected between plus power P and the collector of transistor Q1. The collector of transistor Q1 corresponding to the output of connection status detection unit 72 is connected to one input of AND gate 76. Connection status detection unit 72 is operable even when the power of portable terminal device 80 is off since the secondary battery for backup is employed as the power source.

Connection status detection unit 72 detects whether connector 20 is connected to mobile telephone terminal device 12 as set forth in the following. When connection is established between connector 20 and mobile telephone terminal device 12, current flows from plus power P towards diode D1 via resistor R1. Transistor Q1 is turned off and the output of connection status detection unit 72 attains an H level.

When connector 20 is decoupled from mobile telephone terminal device 12, current flows from plus power P to transistor Q1 via resistor R1. Transistor Q1 is turned on and the output of connection status detection unit 72 is pulled down to an L level.

In other words, connection status detection unit 72 provides an output of an H level when connector 20 is connected to mobile telephone terminal device 12 and provides an output of an L level when connector 20 is decoupled from mobile telephone terminal device 12. The output of connection status detection unit 72 is applied to the other input of AND gate 76.

AND gate 76 ANDs the two inputs. Therefore, power-on signal 46 which is the output of AND gate 76 behaves as below.

(1) When connector 20 is connected to mobile telephone terminal device 12 and telephone terminal device 12 is turned on, power-on signal 46 is at an H level.
(2) When connector 20 is connected to mobile telephone terminal device 12 and mobile telephone terminal device 12 is not turned on, power-on signal 46 is at an L level.
(3) When connector 20 is not connected to mobile telephone terminal device 12, power-on signal 46 is at an L level irrespective of whether mobile telephone terminal device 12 is powered on or not.

The portable terminal device of the first embodiment operates as set forth in the following. When portable terminal device 8 is disconnected from mobile telephone terminal device 12, voltage detection unit 70 provides an output of a high-impedance state.

For the purpose of data communication, the user connects connector 20 of portable terminal device 8 to mobile telephone terminal device 12. The signal on signal line 44 attains an L level. Connection status detection unit 72 provides an output of an H level, which is applied to one input of AND gate 76. Data adapter activate signal 42 is at an H level. Voltage detection unit 70 drives its output to an H level from a high-impedance state. This output of the H level is inverted by inverter 74 to be applied to the other input of AND gate 76 as an L level. Therefore, power-on signal 46 output from AND gate 76 attains an L level. Power supply circuit 50 of portable terminal system unit 32 does not initiate power supply. Data adapter unit 30 is also not powered on.

In response to mobile telephone terminal device 12 being powered on, data adapter activate signal 42 attains an L level. In response, voltage detection unit 70 drive its output to an L level. This L level is inverted by inverter 74 to be applied to one input of AND gate 76 as an H level. Power-on signal 46 of AND gate 76 is driven to an H level. In response, power supply circuit 50 of portable terminal system unit 32 initiates power supply towards portable terminal system unit 32. Data adapter unit 30 enters a power-on state.

In response to the power being supplied to portable terminal system unit 32, processor 54 begins to operate and activates system software 60. System software 60 activates communication software 62 and application program 64 in response to power-on signal 46 of an H level. Initialization is carried out automatically when communication software 62 is activated. When initialization is completed, preparation for data communication ends. The user can immediately initiate data communication.

At the time of ending data communication, the portable terminal device operates as set forth in the following. When the user cuts off the power of mobile telephone terminal device 12, data adapter activate signal 42 attains an H level. Voltage detection unit 70 provides an output of an H level. This output of the H level is inverted by inverter 74 to be applied to AND gate 76 as an L level. Power-on signal 46 output from AND gate 76 attains an L level dependent of the output level of connection status detection unit 72. Accordingly, power supply circuit 50 ceases power supply to portable terminal system unit 32. The power of data adapter unit 30 is also cut off. Therefore, portable terminal unit 10 has its operation suppressed and attains a power-off state.

In the device of the present embodiment, the power of portable terminal device 8 is automatically turned on and the communication software activated to immediately allow data communication by just connecting connector 20 of portable terminal device 80 in a power-off status to mobile telephone terminal device 12 and turning on the power of mobile telephone terminal device 12. Data communication can be initiated with the minimum for preparation operation. Data communication can be carried out easily even at an area of limited space. The possibility of erroneous operation is also reduced. Since the power of portable terminal device 8 is cut off as the data communication ends, the operation required after completion of data communication is reduced.

Second Embodiment

A portable terminal device according to a second embodiment of the present invention can operate according to either a first operational mode where the power of the portable terminal device is cut when the power of mobile telephone terminal device 12 is turned off or a second operational mode where the power of the portable terminal device is not cut off even when the power of mobile telephone terminal device 12 is turned off, in addition to the feature of the first embodiment. The portable terminal device of the second embodiment has the mechanism to switch the operational mode to either the first and second mode. It is assumed that the first operational mode is specified when an operational mode specify signal 112 that will be described afterwards is at an L level and the second operational mode is specified when operational mode specify signal 112 is at an H level.

Figure 4:
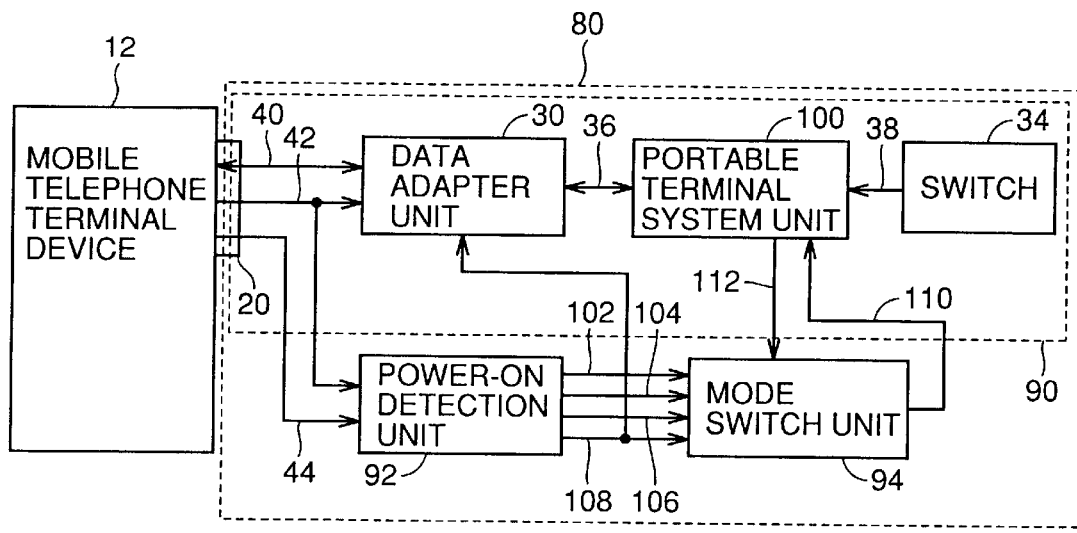
FIG. 4 is a block diagram of a portable terminal device according to a second embodiment of the present invention.

Referring to FIG. 4, a portable terminal device 80 of the second embodiment is used being connected with mobile telephone terminal device 12 via connector 20, as portable terminal device 8 of the first embodiment. Portable terminal device 80 includes a portable terminal unit 90 having the general function as a portable terminal device to carry out data communication with another terminal device not shown via data line 40 and mobile telephone terminal device 12 in response to data adapter activate signal 42, a power-on detection unit 92 responsive to data adapter activate signal 42 applied from mobile telephone terminal device 12 and a signal on signal line 44 to detect power-on of mobile telephone terminal device 12 and applying a power-on detection output 102 to portable terminal unit 90, and a mode switch unit 94 connected to portable terminal unit 90 and power-on detection unit 92 to apply an operational mode signal 110 to portable terminal unit 90 in response to an operational mode specify signal 112 applied by the user via portable terminal system unit 100 and the output of power-on detection unit 92. In the following description in FIGS. 4–7, components corresponding to those of the first embodiment described with reference to FIGS. 1–3 have the same reference character allotted. The name and functions thereof are also identical. Therefore, detailed description thereof will not be repeated here.

Portable terminal unit 90 includes a switch 34, a portable terminal system unit 32 being turned on in response to a switch signal 38 from switch 34 or operational mode signal 110, a data adapter unit 30 providing interface between mobile telephone terminal device 12 and portable terminal system unit 100, and connector 20 already described.

Figure 5:
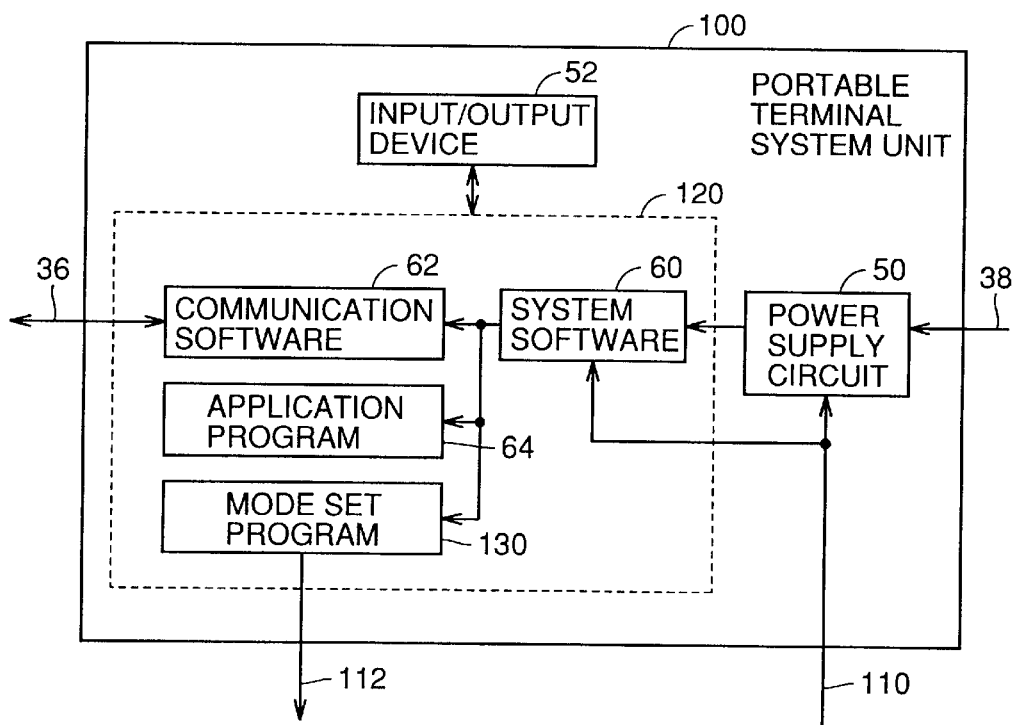
FIG. 5 is a block diagram of a portable terminal system unit 100 of the portable terminal device of the second embodiment.

Referring to FIG. 5, portable terminal system unit 100 includes a power supply circuit 50, an input/output device 52, and a processor 120. As shown in FIG. 5, processor 120 can execute a mode set program 130 used when the user specifies the operational mode in addition to system software 60, communication software 62, and application program 64. Mode set program 130 sets the mode interactively with the user through input/output device 52, and provides operational mode specify signal 112 to mode switch unit 94.

Figure 6:
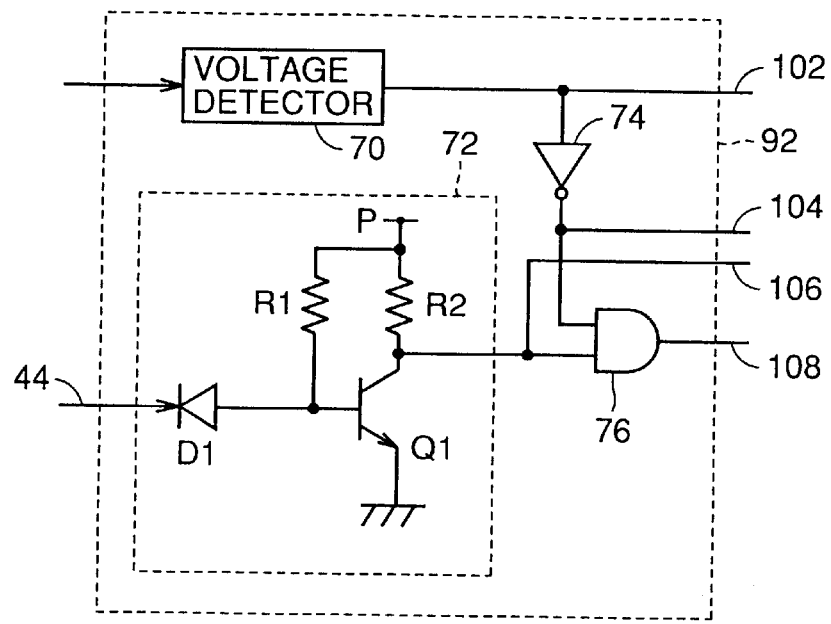
FIG. 6 is a block diagram of a power-on detection unit 92 of the portable terminal device of the second embodiment.

Referring to FIG. 6, power-on detection unit 92 includes a voltage detection unit 70, a connection status detection unit 72, an inverter 74 and an AND gate 76, similar to power-on detection unit 14 of the first embodiment. Power-on detection unit 92 differs from power-on detection unit 14 in that the output of voltage detection unit 70, the output of inverter 74, the output of connection status detection unit 72, and the output of AND gate 76 are provided outside power-on detection unit 92 as a power-on detection output 102, an inverter output 104, a connection status detection unit output 106, and an AND gate output 108, respectively.

Referring to FIG. 4 again, power-on detection output 102, inverter output 104, connection status detection unit output 106, and AND gate output 108 are all applied to mode switch unit 94. AND gate output 108 is also applied to data adapter unit 30 as a power-on detection signal.

Figure 7:
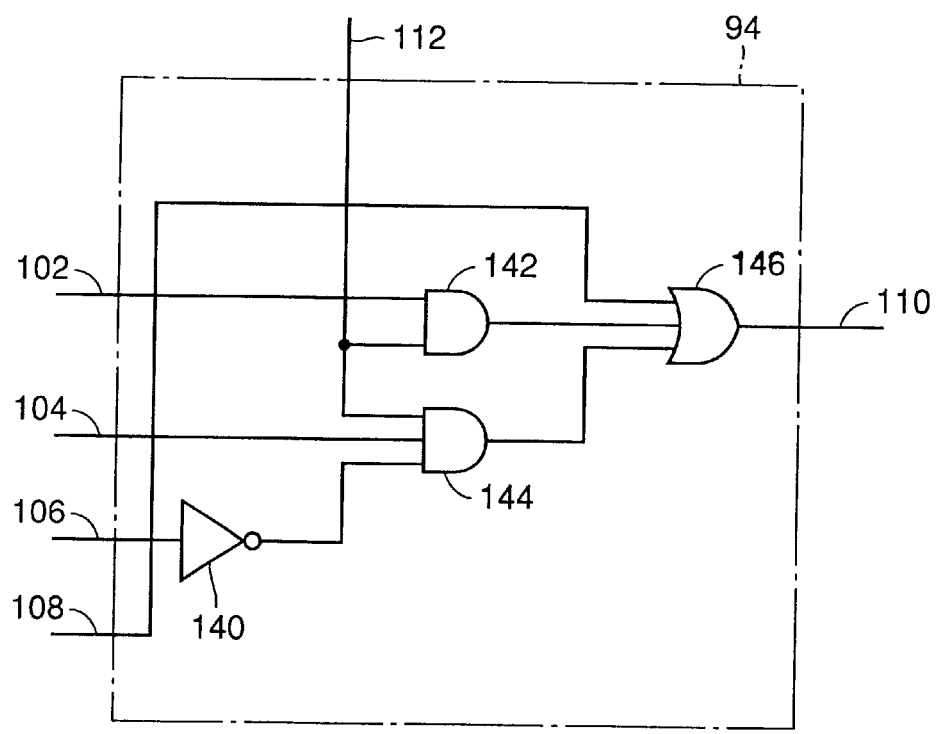
FIG. 7 is a circuit diagram of a mode switch unit 94 of the portable terminal device according to the second embodiment.

Referring to FIG. 7, mode switch unit 94 includes an inverter 140 receiving connection status detection unit output 106 at its input, an AND gate 142 receiving power-on detection output 102 and operational mode specify signal 112 as the two inputs, a 3-input AND gate 144 receiving operational mode specify signal 112, inverter output 104 and the output of inverter 140, and a 3-input OR gate 146 receiving AND gate output 108, the output of AND gate 142, and the output of 3-input AND gate 144.

Mode switch unit 94 has its output altered as set forth in the following. As described before, power-on detection output 102 attains an L level and an H level, respectively, when mobile telephone terminal device 12 is powered on and off, respectively. In contrast, inverter output 104 attains an H level and an L level, respectively, when mobile telephone terminal device 12 is powered on and off, respectively. Connection status detection unit output 106 corresponding to the output of connection status detection unit 72 attains an H level when connector 20 is connected to mobile telephone terminal device 12, and otherwise attains an L level. AND gate output 108 attains an H level when power-on detection output 102 which is the output of voltage detection unit 70 is at an L level (i.e., connector 20 is connected to mobile telephone terminal device 12) and when connection status detection unit output 106 is at an H level (i.e., connector 20 is connected to mobile telephone terminal device 12), and attains an L level otherwise.

From the foregoing, operational mode signal 110 output from mode switch unit 94 behaves as set forth in the following.

(1) When operational mode specify signal 112 is at an L level, the level of operational mode signal 110 matches the level of AND gate output 108. Therefore, in the first operational mode, portable terminal device 80 operates in a manner similar to that of portable terminal device 8 of the first embodiment.

(2) When operational mode specify signal 112 is at an H level (i.e., when in the second operational mode), operational mode signal 110 attains an H level in the following cases:

(2-1) when AND gate output 108 is at an H level, i.e. when the power of mobile telephone terminal device 12 is on;

(2-2) when power-on detection output 102 is at an H level (i.e., the power of mobile telephone terminal device 12 is cut off); or (2-3) when connection status detection unit output 106 is at an L level and inverter output 104 is at an H level (i.e., connector 20 is decoupled from mobile telephone terminal device 12).

Once this second operational mode is set, operational mode signal 110 maintains the H level even if the power of mobile telephone terminal device 12 is cut off or connector 20 is decoupled from mobile telephone terminal device 12.

Having described the structure of the second embodiment, its operation will be described hereinafter.

By connecting connector 20 to mobile telephone terminal device 12 and turning on the power of mobile telephone terminal device 12, portable terminal device 80 is turned on. Then, system software 60, communication software 62 and application program 64 required for data communication are activated. This is similar to the operation of the first embodiment.

Now, consider the case where the user activates mode set program 130, and sets the operational mode to either the first or second operational mode through input/output device 52.

In the case where portable terminal device 80 is set to the first operational mode, operational mode specify signal 112 attains an L level. Therefore, AND gate output 108 and operational mode signal 110 both attain an L level when the power of mobile telephone terminal device 12 is cut off or when connector 20 is decoupled from mobile telephone terminal device 12, as in the first embodiment. In response, portable terminal system unit 100 and data adapter unit 30 both attain a power-off state.

In the case where portable terminal device 80 is set to the second operation mode, operational mode specify signal 112 attains an H level. When the power of mobile telephone terminal device 12 is cut off or when connector 20 is decoupled from mobile telephone terminal device 12, AND gate output 108 is driven to an L level. However, operational mode signal 110 remains at the H level. Therefore, data adapter unit 30 has the power turned off, whereas portable terminal system unit 100 is still ON. Thus, portable terminal device 80 can be used continuously even if the power of mobile telephone terminal device 12 is cut off subsequent to completion of the data communication.

Similar to the first embodiment, the present embodiment has the terminal device 80 powered on automatically and the communication software activated to allow data communication immediately by just connecting connector 20 of portable terminal device 80 in a power-off status and turning on the power of mobile telephone terminal device 12. Data communication can be initiated with the minimum preparation task. Data communication can be carried out easily even at an area of limited space. The possibility of erroneous operation is reduced. Furthermore, the operational mode can be specified to have the power of portable terminal device 80 cut off or not at the completion of data communication. Thus, the power of portable terminal device 80 can be controlled with the minimum operation according to whether a task is to be carried out after completion of data communication. Even if the power of portable terminal device 80 is not cut off after completion of the data communication, the power of the data adapter unit that is used only for data communication is turned off. This prevents the data adapter from consuming extra power. The operating period of time of the portable terminal device by means of the battery can be increased.

The present invention is not limited to the above-described embodiments. By providing a logic circuit that obtains an output matching a predetermined condition with power-on detection output 102, inverter output 104, connection status detection unit output 106, AND gate output 108 shown in FIG. 6 and the like as the input, various control conformable to a specific purpose can be effected at the time of decoupling connector 20 from mobile telephone terminal unit 12 or at the time of the power of connector 20 being cut off.

In the above-described second embodiment, the mode specify signal is not stored in the portable terminal device. However, the present invention is not limited thereto. Information corresponding to the mode specify signal can be stored in the portable terminal device. Accordingly, an operation mode, once set, can be maintained even after power is cut off.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A portable information terminal device comprising:
   a connector to be connected to a mobile telephone terminal device of the type providing a first output signal that changes its value depending upon whether power to said mobile telephone terminal device is turned on or not;
   a power-on detection device connected to said connector;
   a power supply circuit for providing power to the portable information terminal device under control of said power-on detection device; and
   a data communication device receiving power from said power supply circuit under control of an output of said power-on detection device.

2. The portable terminal device according to claim 1, wherein said data communication device comprises a processor which activates system software when power supply is initiated from said power supply circuit,
   said system software activating communication software to carry out said data communication in response to an output of said power-on detection device.

3. The portable terminal device according to claim 2, said system software activating an application program utilizing said communication software in response to an output of said power-on detection device.

4. The portable terminal device according to claim 1, further comprising a data adapter unit coupled between said data communication device and said connector.

5. The portable terminal device according to claim 4, said data adapter unit having power controlled by an output of said power-on detection device.

6. The portable terminal device according to claim 1, further comprising a switch for said power supply circuit connected to said power supply circuit.

7. The portable terminal device according to claim 1, said first signal attaining a different voltage level depending upon whether power of said telephone terminal device is turned on or not;
   wherein said power on detection device includes a voltage detection device receiving said first signal.

8. The portable terminal device according to claim 7, wherein said power-on detection device further includes a connection status detection unit connected to said terminal of said connector.

9. The portable terminal device according to claim 8, wherein said power-on detection device further comprises
   an inverting circuit receiving an output of said voltage detection device, and
   a first AND gate having inputs receiving outputs of said inverting circuit and said connection status detection unit, and an output coupled to said data adapter unit and said data communication device.

10. The portable terminal device according to claim 8, wherein said power-on detection device further comprises
    a first inverting circuit receiving an output of said voltage detection device, and
    a first AND gate having inputs receiving outputs of said first inverting circuit and said connection status detection unit, and an output coupled to said data adapter unit and said data communication device.

11. The portable terminal device according to claim 10, wherein said mode switch circuit includes a logic circuit having an input receiving an output of said voltage detection device, an output of said first inverting circuit, an output of said connection status detection unit, an output of said first AND gate, and said mode specify signal, and an output coupled to said mode signal.

12. The portable terminal device according to claim 11, wherein said logic circuit includes
    a second inverting circuit receiving an output of said connection status detection unit,
    a second AND gate having inputs receiving an output of said voltage detection circuit and said mode specify signal,
    a third AND gate of 3 inputs receiving said mode specify signal, an output of said first inverting circuit, and an output of said second inverting circuit, and
    a 3-input OR gate receiving an output of said first AND gate, an output of said second AND gate, and an output of said third AND gate.

13. A portable information terminal device comprising;
    a connector to be connected to a mobile telephone terminal device of the type providing a first output signal that changes its value depending upon whether power to said mobile telephone terminal device is turned on or not;

a power-on detection device connected to said connector;

a mode switch circuit having an input receiving an output of said power-on detection device and a predetermined mode specify signal to determine an output mode signal;

a power supply circuit for providing power to the portable information terminal device under control of said output mode signal; and a data communication device receiving power from said power supply circuit under control of an output of said power-on detection device.

14. The portable terminal device according to claim 13, wherein said data communication device comprises a processor which activates system software when power supply from said power supply circuit is initiated, said system software activating communication software to carry out said data communication in response to said mode signal.

15. The portable terminal device according to claim 14, said system software activating an application program utilizing said communication software in response to an output of said power-on detection device.

16. The portable terminal device according to claim 14, said system software further capable of executing an operational mode set application that specifies an operational mode, said operational mode set application applying a mode specify signal to said mode switch circuit.

17. The portable terminal device according to claim 13, further comprising a data adapter unit coupled between said data communication device and said connector.

18. The portable terminal device according to claim 17, said data adapter unit having power controlled by an output of said power-on detection device.

19. The portable terminal device according to claim 13, further comprising a switch for said power supply circuit connected to said power supply circuit.

20. The portable terminal device according to claim 13, said first signal attaining a different voltage level depending upon whether power of said telephone terminal device is turned on or not;

wherein said power on detection device includes a voltage detection device receiving said first signal.

21. The portable terminal device according to claim 20, wherein said power-on detection device further includes a connection status detection unit connected to said terminal of said connector.

* * * * *